United States Patent [19]
Brandmeier et al.

[11] Patent Number: 5,961,190
[45] Date of Patent: Oct. 5, 1999

[54] BRAKE SYSTEM FOR A MOTOR VEHICLE

[75] Inventors: Thomas Brandmeier, Regensburg; Dirk Zittlau, Stoeckelsberg, both of Germany

[73] Assignee: Siemens Aktiengesellschaft, Munich, Germany

[21] Appl. No.: 08/779,969

[22] Filed: Dec. 23, 1996

[30] Foreign Application Priority Data

Dec. 12, 1995 [DE] Germany .......................... 195 48 392

[51] Int. Cl.$^6$ ............................................. B60T 13/66
[52] U.S. Cl. ............................. 303/152; 188/159; 303/20
[58] Field of Search ........................... 303/20, 152, 151, 303/122.04, 122.05, 3, 15; 188/158–162

[56] References Cited

U.S. PATENT DOCUMENTS

| | | | |
|---|---|---|---|
| 3,792,742 | 2/1974 | Mager | 188/159 |
| 4,270,808 | 6/1981 | Brearley | 303/20 |
| 4,300,088 | 11/1981 | Hicks | 188/159 |
| 4,326,236 | 4/1982 | McNair et al. | 303/20 |

FOREIGN PATENT DOCUMENTS

| | | |
|---|---|---|
| 0 467 112 A2 | 1/1992 | European Pat. Off. . |
| 0 486 281 B1 | 5/1992 | European Pat. Off. . |
| 43 35 769 C1 | 12/1994 | Germany . |
| 2 225 397 | 5/1990 | United Kingdom . |

*Primary Examiner*—Matthew C. Graham
*Attorney, Agent, or Firm*—Herbert L. Lerner; Laurence A. Greenberg

[57] ABSTRACT

A brake system for a motor vehicle with four wheels has four electrically controlled wheel brake devices. Each of the wheel brake devices has a control part and an actuator, with which the various wheel brakes are activated independently of one another in response to actuations of the brake pedal by the driver. The brake system has two separate electrical control units, each for a respective two of the four wheel brake devices. Both of the separate control units receive control signals separately from a brake force simulator, and they each have their own energy supply circuit. An additional central control unit controls additional functions of the system (ABS, traction control, etc.) at each of the four wheel brake devices which serve safety or comfort purposes of the motor vehicle.

4 Claims, 1 Drawing Sheet

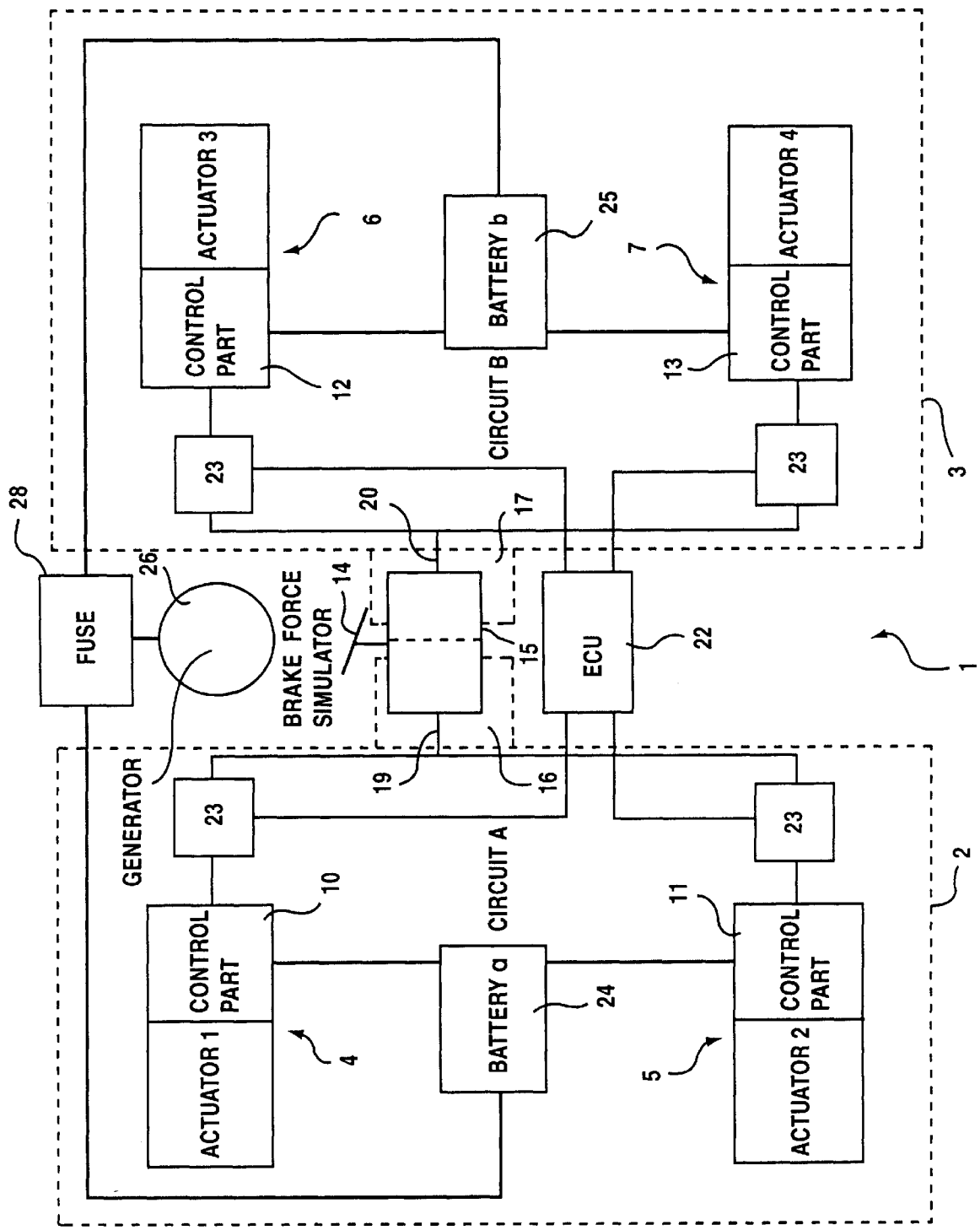

BRAKE SYSTEM FOR A MOTOR VEHICLE

BACKGROUND OF THE INVENTION

FIELD OF THE INVENTION

The invention relates to a brake system for a motor vehicle with electrically controlled wheel brake devices, which each comprise one control part and one actuator. The individual wheel brakes are activated by the devices independently of one another and in response to actuations of the brake pedal. There are provided two separate electrical control circuits, which are each provided for one portion of the wheel brake devices, both of which receive control signals from a device that detects actuations of the brake pedal and which each have their own power supply circuit, so that even in the event of a breakdown of one or more actuators, safe braking of the motor vehicle is ensured.

Virtually all passenger cars today are equipped with hydraulic brake systems. Increasing demand for additional brake functions—such as anti-lock brake systems, drive stabilizer systems, traction controls and sophisticated cruise controls—and demands to reduce the expenses for assembly and maintenance and to make the hydraulic devices smaller have led to the development of purely electrical brake systems (also known by the term "brake by wire").

In such electrical brake systems, the brake signal actuated by the driver is separated in terms of force from the brakes; that is, the brake moment demand on the part of the driver is no longer transmitted directly as force via a hydraulic (or compressed-air-actuated) system, but it is now transmitted only in the form of an electrical signal over electrical lines. With the electrical signal, the brake actuator (or brake actor) is controlled that generates the requisite brake moment with an independent energy supply. As a rule, this energy supply is furnished from the on-board electrical system, and the brake moment is generated by an electromechanical or electro-hydraulic actuator and it is transmitted to a brake disk or brake drum (see earlier German patent application DE 195 29 664.8, applicant's docket GR 95 P 1763).

Since the brake system is a central safety function of the motor vehicle, it must assure extensive freedom from failure, and in the event of a malfunction it must enable braking of the vehicle, at least with reduced action. To that end, a dual-circuit brake system is demanded by law; as a rule, it is realized in the form of two separate hydraulic brake circuits.

In a known brake system with electrically controlled wheel brake devices, which each comprise one control part and one actuator, by which the individual wheel brakes are activated independently of one another and as a function of actuations of the brake pedal, an emergency system is provided by which braking of the motor vehicle is enabled in the event that one or more actuators fails (European patent publication EP-A 0 486 281). Defective actuators are detected, and in the case of braking the functional actuators, or some of them, are actuated in accordance with a predetermined scheme.

Another known brake system has two separate electrical control circuits, each for two wheel brakes. Both of them receive control signals from a device that detects actuations of the brake pedal, and they each have their own energy supply circuit (British Patent GB 2 225 397 A). Additional brake functions that provide safety or comfort in motor vehicle operation cannot be achieved with this system.

In another known brake system, the control electronics are embodied in noncentralized fashion. A central module and a plurality of wheel modules each have microprocessors with their own "intelligence". The wheel modules are hierarchically subordinate to the central module (European patent publication EP 0 467 112 A). The expense for circuitry and programming is considerable.

SUMMARY OF THE INVENTION

It is accordingly an object of the invention to provide a brake system for a motor vehicle, which overcomes the above-mentioned disadvantages of the heretofore-known devices and methods of this general type and which allows implementation of additional functions of the brakes by simple means.

With the foregoing and other objects in view there is provided, in accordance with the invention, a brake system for a motor vehicle having wheels with wheel brakes and a brake pedal. The brake system comprises:

a plurality of electrically controlled wheel brake devices, each wheel brake device comprising a control part (particularly a microprocessor-controlled control part) and an actuator, and the wheel brake devices activating individual wheel brakes of the motor vehicle independently of one another and in response to actuations of a brake pedal;

two separate electrical control circuits each connected to a respective portion of the wheel brake devices, and each having a separate energy supply circuit for ensuring braking of the motor vehicle in the event of a failure of one or more actuators;

a detector device connected to the brake pedal for detecting actuations of the brake pedal, the detector device outputting control signals to the control circuits in response to the actuations of the brake pedal; and an additional central control unit connected to all of the wheel brake devices, the central control unit controlling brake functions of the brake system serving safety features or comfort features of the motor vehicle.

In accordance with an added feature of the invention, the first energy supply circuit is supplied from the regular vehicle battery, and the system includes an additional battery supplying the second energy supply circuit, the additional battery having a power capacity adapted to a required output of the brake circuit.

In accordance with another feature of the invention, the first energy supply circuit is supplied from the vehicle battery and the second supply circuit is supplied by the generator of the motor vehicle and includes an additional battery with sufficient capacity for a few braking events.

The advantages of the invention are in particular that the safety demands to be made of the brake system are met with little effort or expense and by simple means. Specifically, the brake system according to the invention requires no additional hydraulic emergency or substitute devices whatever and requires no special fail-safe central control unit for the normal brake function.

Other features which are considered as characteristic for the invention are set forth in the appended claims.

Although the invention is illustrated and described herein as embodied in a brake system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole FIGURE of the drawing is a schematic block diagram of a brake system according to the invention.

DESCRIPTION OF THE PREFERRED EMBODIMENTS

Referring now to the FIGURE of the drawing in detail, a brake system 1 has two brake circuits, namely a circuit A and a circuit B, which are indicated in the FIGURE within the dashed boxes 2 and 3. The system includes four wheel brake devices 4, 5, 6 and 7, of which the wheel brake devices 4 and 5 belong to the brake circuit A and the wheel brake devices 6, 7 belong to the brake circuit B.

Each wheel brake device comprises an actuator (actuator 1 through actuator 4) and an associated control part 10, 11, 12 and 13. Details of the actuators need not be described here: they may be electro-hydraulic actuators (as described in the aforementioned earlier application by the present applicant) or they may be provided with an electromechanical drive (as in the European patent publication EP-B 0 486 281).

A detector device—such as a brake force simulator 15—is connected to a brake pedal 14 of the motor vehicle by which actuations of the brake pedal 14 are detected. The brake force simulator 15 includes two separate electronic sensors units 16 and 17, with which the pedal travel specified by the driver and/or the pedal force are measured. The measured variable is converted into control signals, which are supplied to brake circuit A via a first signal output line 19 and to brake circuit B via a second signal output line 20. These control signals represent the desired brake values; they reach the wheel brake devices 4, 5 and 6, 7, respectively, where they cause the associated actuators to actuate the respective brakes. Thus the brake system 1 executes the braking actions desired by the motor vehicle driver, and also, since it is split into two brake circuits, it has the requisite fail-safeness.

The brake system 1 also has an electronic control unit—or additional control unit 22 (also known as an electronic control unit ECU), which controls merely additional functions of the brakes by which the safety and/or comfort of the motor vehicle are increased, and which have already been mentioned at the outset (such as ABS, traction control, etc.). The additional control unit 22 is not necessary for fail-safe function of the brake system 1 of the invention.

The control signals generated by the control unit 22 reach electronic elements or switches 23, in which they are superimposed on the control signals or desired brake values generated by the brake force simulator 14. This superposition is equivalent to the signal superposition in hydraulic brake systems but can be realized very simply with electronic elements. The elements 23 are designed in such a way, for instance as relays, that the control signals generated by the brake force simulator will in all cases reach the wheel brake devices 4–7, even if the additional electronic control unit 22 should fail. In the event of a possible failure of the control unit 22, only the additional functions of the brake system, such ABS, will be impaired but not the normal brake function.

The energy supply to the brake system 1 is likewise divided into two circuits, which each include a first battery a and a second battery b. The lines used for the energy supply are shown in the drawing as heavy lines, while the signal lines are shown as fine lines. The regular car battery may be used as the battery a, while an additional smaller battery is used as the battery b. The latter is thereby adapted to the required output of the brake circuit connected to it. Instead of the battery b, the generator 26 of the motor vehicle can be used as the energy storing means 25, with a small battery as an emergency buffer that has sufficient capacity for a few braking events. The two energy supply circuits are connected to one another through a fuse 28, which in the case of a malfunction, such as a short circuit, disconnects the two circuits completely from one another.

By means of the brake system according to the invention, the following possible errors are intercepted: a failure of the electronic control unit 22 or a break in the electrical lines connected to it, a failure of one or two actuators, a failure of one energy supply, a break in the connecting lines inside the brake system, and a short circuit in one supply circuit or in the generator 26.

The control parts 10–13 expediently contain a microprocessor and form an independent unit together with the respective actuator. Details of the controller are not shown here, since the controller is known per se and is not touched by the invention. If the control signals of the brake force simulator are transmitted as a pulse-width-modulated signal, then the control part 10–13 is embodied as a PWM end stage with electronic commutation.

The brake system according to the invention represents a fully equivalent high-performance analogy to the usual dual-circuit hydraulic brake systems with all their additional functions. However, it is achieved at less effort and expense and with simpler means.

We claim:

1. A brake system for a motor vehicle having wheels with wheel brakes and a brake pedal, the brake system comprising:

a plurality of electrically controlled wheel brake devices, each wheel brake device comprising a control part and an actuator, and said wheel brake devices activating individual wheel brakes of the motor vehicle independently of one another and in response to actuations of the brake pedal;

two separate electrical control circuits each connected to a respective portion of said wheel brake devices, and each having a separate energy supply circuit for ensuring braking of the motor vehicle in the event of a failure of one or more actuators;

a detector device connected to the brake pedal for detecting actuations of the brake pedal, said detector device outputting control signals to said control circuits in response to the actuations of the brake pedal; and an additional central control unit connected to all of the wheel brake devices, said central control unit controlling brake functions of the brake system serving safety features or comfort features of the motor vehicle.

2. The brake system according to claim 1, wherein the motor vehicle has a vehicle battery, and said first energy supply circuit is supplied from the vehicle battery, and including an additional battery supplying said second energy supply circuit, said additional battery having a power capacity adapted to a required output of the brake circuit.

3. The brake system according to claim 1, wherein the motor vehicle has a vehicle battery and a generator, said first energy supply circuit being supplied from the vehicle battery, and wherein said second supply circuit is supplied by the generator and includes an additional battery having sufficient capacity for a few braking events.

4. The brake system according to claim 1, wherein each of said control parts is a microprocessor-controlled control part.

* * * * *